(No Model.)
O. MERGENTHALER.
MEANS FOR JUSTIFYING TYPE MATRICES AND TYPE.
No. 538,176. Patented Apr. 23, 1895.
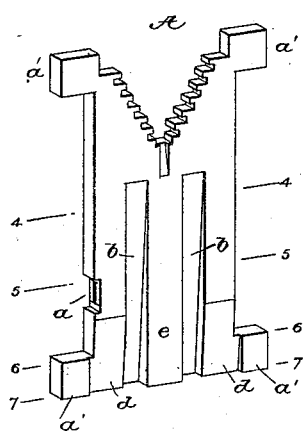
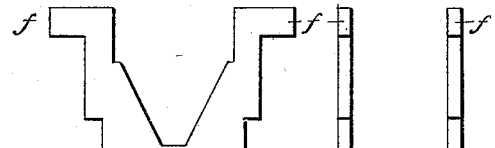
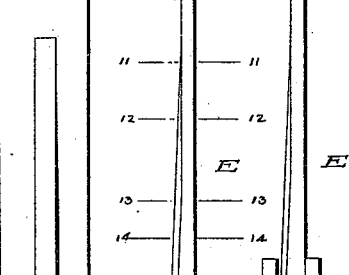
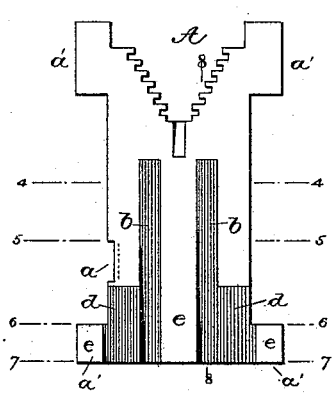
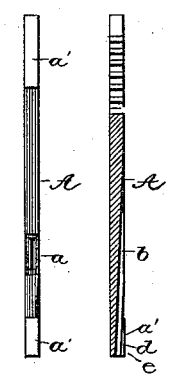
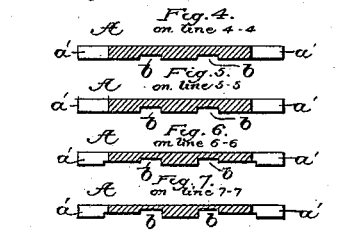
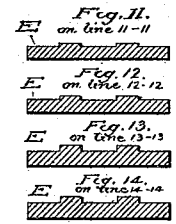

UNITED STATES PATENT OFFICE.

OTTMAR MERGENTHALER, OF BALTIMORE, MARYLAND, ASSIGNOR TO THE NATIONAL TYPOGRAPHIC COMPANY, OF WEST VIRGINIA.

MEANS FOR JUSTIFYING TYPE-MATRICES AND TYPE.

SPECIFICATION forming part of Letters Patent No. 538,176, dated April 23, 1895.

Application filed October 29, 1890. Serial No. 369,735. (No model.)

*To all whom it may concern:*

Be it known that I, OTTMAR MERGENTHALER, of Baltimore, in the State of Maryland, have invented certain Improvements in Means for Justifying Type-Matrices and Type, of which the following is a specification.

The present invention has reference to the so called "linotype machines," originated by me, and represented in numerous Letters Patent, wherein a series of type matrices representing the characters to be printed in one line, are selected and temporarily aligned with intermediate spacing devices, against the front of a mold in order to close the same and to produce raised type characters on the bars cast therein. As the bars or linotypes must be of uniform length it is necessary to space out the line of matrices to the predetermined length, or in the language of the printer, to "justify the line." For this purpose various adjustable or expansible spacing devices have been devised and used with more or less success. Now it is the aim of my invention to provide a more simple and efficient means to this end, and I have therefore devised a peculiar formation of the matrices and a peculiarly formed tapered space-bar, in one piece, to be used therewith, the bar being adapted to co-operate with the matrices in closing the mold, and also adapted to gradually increase the spaces in the line by imperceptible degrees from the minimum to the maximum limit.

In the drawings I have represented the matrices and space-bars of a form adapted for use in the machine shown in my Patent No. 436,532, dated September 16, 1890, but it is to be understood that except as to their co-operating side faces they may be varied in form at will to adapt them for use in other machines.

In the accompanying drawings,—Figure 1 is a perspective view of one of the matrices. Fig. 2 is a side view of the same. Fig. 3 is an edge view of the same. Figs. 4 to 7 are cross-sections on the correspondingly-numbered lines of Figs. 1 and 2. Fig. 8 is a vertical section on the line 8—8. Fig. 9 is a side view of one of the space bars. Fig. 10 is an edge view of the same. Figs. 11 to 14 are cross-sections of the same on the correspondingly numbered lines. Fig. 15 is an edge view showing the matrix and space bar in operative relations. Fig. 16 is a cross section on the line 16—16 of the preceding figure.

Referring to the drawings, A represents the matrix or type in the form of a flat metal plate having the character or matrix proper $a$, in one edge, and having at the ends shoulders $a'$, by which it is sustained and guided in the machine. In the above particulars the matrix is identical with those now in use.

In applying my improvement I cut into the side of the matrix one or more longitudinal grooves $b$, of gradually increasing depth from a point near the upper end to the lower end, so that in vertical section through these grooves the matrix presents a wedge-like form as shown in Fig. 8. I also bevel away the side face of the matrix from a point just below the matrix to the lower end, as shown at $d$, Figs. 1, 2 and 3. These inclined surfaces stand at the same angle or inclination as the bottom of groove $b$, but preferably at a higher level. Between the inclined surfaces I leave bearing surfaces $e$, of the original height, parallel with the surface on the opposite side of the matrix, so that the matrix is of uniform thickness from end to end. This formation of the matrix with parallel bearing faces on opposite sides is important in that it permits the matrices to be locked up side by side against each other in parallel lines, and in that it prevents them from slipping endwise past each other in the magazine channels of the machine as they would do if reduced in thickness across the entire end.

E represents the space-bar made in one piece, of a width equal to that of the body of the matrices with suspending shoulders $f$, at the top, so that it may be set and sustained in line with the matrices after the manner of the space bars now in use. The space bar is of much greater length than the matrix and of gradually increasing thickness toward its lower end. On one side it is grooved or channeled longitudinally to fit the side face of the matrix, the raised surfaces of the one being adapted to closely fit the depressions of the other as clearly shown in Figs. 15 and 16, in which it will be observed that the raised ribs of the space project into the grooves of the matrix, while the flat surfaces of the space bear against the inclined surfaces $d$ of the matrix. When thus united the outer or distant surfaces of the two are parallel and the bar is free to slide endwise along the matrix so as to produce an increasing thickness in the line without destroying this parallelism.

Thus it is that I am enabled by the use of the spacing devices each in one piece, to effectively justify the line without canting or tipping the matrices sidewise. The front edge of the space lies flush with the front edge of the matrix body, and in such close proximity to the character that no difficulty is encountered from the entrance of the metal or the formation of burrs between them on the linotype. As the upper end of the bar forms the minimum space in the line I prefer to form the bar with its opposite faces parallel for a distance equal to the length of the matrix.

It will be observed that as constructed the matrices are adapted to stand vertically and parallel whether in contact with each other or with the space-bar.

I do not claim broadly herein, a matrix having a depression cut obliquely or at an inclination through its side face to receive a justifying wedge, my invention being limited to a matrix having parallel side faces and with an inclined groove or bearing on at least one side face, to receive a justifying wedge, the front face of the matrix being also inclined adjacent to the character that the wedge acting thereon may fill, or practically fill the space between two adjacent matrices, flush with their front, in order to co-operate with the matrices in closing the mold; and to the combination of such matrices with the wedge-shaped space adapted to fit between them, in the manner herein described.

Having thus described my invention, what I claim is—

1. In combination with a matrix having parallel bearing faces on opposite sides and an inclined bearing face in one side, a continuously tapered space-bar, fitted to enter the depression in the matrix and also to fit against the beveled side of the matrix, flush with its forward edge.

2. The matrix, having parallel bearing faces on opposite sides, a beveled or inclined bearing surface in the side and a beveled or inclined surface extending to the front edge, adjacent to the character or matrix proper.

3. The matrix, having parallel bearing faces on opposite sides, an inclined or beveled surface in one side and an inclined side face adjacent to the character, in combination with a space-bar continuously tapered and adapted to fit and slide within and against the side of the matrix, flush with its forward edge.

4. A series of matrices, each having parallel bearing faces on opposite sides and inclined surfaces $b$ and $d$ in the side below the level of the bearing surfaces, in combination with a series of tapered space-bars, each having their sides adapted to fit into the matrices, and their forward edges adapted to fill the space between the matrix characters, flush with the forward edges of the matrices.

5. A matrix having parallel bearing surfaces on opposite sides, a beveled surface $d$ adjacent to the character or matrix proper, and an inclined surface $b$ within the side.

6. The matrices provided with parallel bearing faces on opposite sides and with the inclined surfaces $b$ and $d$ and an intermediate surface $e$ in combination with the elongated tapered space bars longitudinally grooved to fit into the side face of the matrices.

In testimony whereof I hereunto set my hand, this 13th day of October, 1890, in the presence of two attesting witnesses.

OTT. MERGENTHALER.

Witnesses:
PH. H. HOFFMAN,
W. SUMTER BLACK.